(12) United States Patent
Haslauer

(10) Patent No.: US 10,259,411 B2
(45) Date of Patent: Apr. 16, 2019

(54) WEIGHT-REDUCING SURFACE STRUCTURING ON COMPONENTS PRODUCED BY A CASTING METHOD

(71) Applicant: Bayerische Motoren Werke Aktiengesellschaft, Munich (DE)

(72) Inventor: Christian Haslauer, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 31 days.

(21) Appl. No.: 15/262,079

(22) Filed: Sep. 12, 2016

(65) Prior Publication Data

US 2016/0375849 A1 Dec. 29, 2016

Related U.S. Application Data

(63) Continuation of application No. PCT/EP2015/054888, filed on Mar. 10, 2015.

(30) Foreign Application Priority Data

Mar. 12, 2014 (DE) .................. 10 2014 204 563

(51) Int. Cl.
*B60R 19/18* (2006.01)
*B62D 25/08* (2006.01)
(Continued)

(52) U.S. Cl.
CPC .............. *B60R 19/18* (2013.01); *B22D 18/00* (2013.01); *B22D 25/02* (2013.01); *B62D 25/087* (2013.01);
(Continued)

(58) Field of Classification Search
CPC ....... Y10T 428/12201; Y10T 428/1234; Y10T 428/12389; Y10T 428/12396; Y10T 428/12417; Y10T 428/12208
(Continued)

(56) References Cited

U.S. PATENT DOCUMENTS 3,844,336 A * 10/1974 Anderson .......... B22D 11/0622
164/428
3,907,232 A  9/1975 Odermatt
(Continued)

FOREIGN PATENT DOCUMENTS

CN 101758860 A 6/2010
CN 102937235 A 2/2013
(Continued)

OTHER PUBLICATIONS

English language machine translation of DE3310231 dated Sep. 15, 2018 (Year: 2018).*
(Continued)

*Primary Examiner* — Adam Krupicka
(74) *Attorney, Agent, or Firm* — Crowell & Moring LLP

(57) ABSTRACT

A cast component, in particular for a vehicle, has a surface structuring arranged on at least one wall portion of the cast component. The surface structuring forms a surface of the wall portion, and stiffens the wall portion. The surface structuring is formed by a plurality of evenly shaped depressions in the surface of the wall portion, which depressions are mutually spaced apart, leaving interconnected webs, and produce tapered sections on the wall portion.

5 Claims, 2 Drawing Sheets

(51) Int. Cl.
   *B62D 29/00* (2006.01)
   *B22D 18/00* (2006.01)
   *B22D 25/02* (2006.01)

(52) U.S. Cl.
   CPC ......... *B62D 25/088* (2013.01); *B62D 29/008* (2013.01); *B60R 2019/182* (2013.01); *B60R 2019/1866* (2013.01); *Y10T 428/1234* (2015.01); *Y10T 428/12389* (2015.01); *Y10T 428/12396* (2015.01)

(58) Field of Classification Search
   USPC .......................................................... 164/428
   See application file for complete search history.

(56) References Cited

U.S. PATENT DOCUMENTS

| | | | | |
|---|---|---|---|---|
| 4,825,603 | A | * | 5/1989 | Hardwicke ....... E04F 15/02405 52/126.6 |
| 5,529,645 | A | * | 6/1996 | Oswalt .................. B22D 25/02 148/437 |
| 5,769,153 | A | * | 6/1998 | Ayers .................... B22D 11/06 164/131 |
| 6,332,642 | B1 | | 12/2001 | Hanyu |
| 6,547,281 | B1 | | 4/2003 | Iwatsuki |
| 2006/0066132 | A1 | | 3/2006 | Page, Jr. |
| 2008/0185875 | A1 | | 8/2008 | Joest et al. |
| 2009/0175006 | A1 | | 7/2009 | Jou et al. |
| 2010/0164214 | A1 | | 7/2010 | Hartmann et al. |
| 2010/0326395 | A1 | | 12/2010 | Lohr |
| 2013/0134742 | A1 | | 5/2013 | Mildner et al. |

FOREIGN PATENT DOCUMENTS

| | | |
|---|---|---|
| CN | 202779248 U | 3/2013 |
| CN | 103129626 A | 6/2013 |
| DE | 2 325 144 | 6/1974 |
| DE | 33 10 231 A1 | 10/1983 |
| DE | 699 11 601 T2 | 4/2004 |
| DE | 600 15 683 T2 | 12/2005 |
| DE | 102005043948 A1 | 4/2007 |
| DE | 10 2006 008 667 A1 | 9/2007 |
| DE | 10 2007 006 031 A1 | 8/2008 |
| DE | 10 2008 051 999 A1 | 4/2010 |
| DE | 10 2009 034 907 A1 | 2/2011 |
| DE | 10 2009 040 322 A1 | 3/2011 |
| DE | 10 2010 055 954 A1 | 8/2011 |
| DE | 10 2010 055 444 A1 | 6/2012 |
| EP | 1 840 010 A1 | 10/2007 |

OTHER PUBLICATIONS

International Search Report (PCT/ISA/210) issued in PCT Application No. PCT/EP2015/054888 dated Apr. 24, 2015, with English translation (six (6) pages).
German Search Report issued in counterpart German Application No. 10 2014 204 563.0 dated Jan. 21, 2015, with partial English translation (fifteen (15) pages).
Chinese-language Office Action issued in counterpart Chinese Application No. 201580012902.X dated May 3, 2018 (six (6) pages).
Chinese-language Office Action issued in counterpart Chinese Application No. 201580012902.X dated Aug. 8, 2017 (six (6) pages).

* cited by examiner

WEIGHT-REDUCING SURFACE STRUCTURING ON COMPONENTS PRODUCED BY A CASTING METHOD

CROSS REFERENCE TO RELATED APPLICATIONS

This application is a continuation of PCT International Application No. PCT/EP2015/054888, filed Mar. 10, 2015, which claims priority under 35 U.S.C. § 119 from German Patent Application No. 10 2014 204 563.0, filed Mar. 12, 2014, the entire disclosures of which are herein expressly incorporated by reference.

BACKGROUND AND SUMMARY OF THE INVENTION

The invention relates to a cast component, in particular for a vehicle, wherein a surface structuring disposed on at least one wall portion of the cast component forms a surface of the wall portion that stiffens the wall portion.

Furthermore, the invention relates to a method for producing a cast component, in particular for a vehicle, using a casting method, wherein on at least one wall portion of the cast component, a surface structuring is developed, which forms a surface of the wall portion and stiffens the wall portion.

It is known, especially in the automotive industry, to produce components using a casting method or a deep drawing method. Compared to deep drawing methods, casting methods have the advantage that more complex component geometries can be realized.

Cast components produced by means of a casting method generally have a uniform wall thickness and are provided with a planar or rounded off surface. The wall thickness of a cast component as well as the shaping and dimensioning of a cast component define the volume and consequently the weight of the cast component.

A planar surface of a cast component may form an oscillation membrane. When such a cast component is integrated in a vehicle, the surface of the cast component formed as an oscillation membrane can conduct sound waves into the interior of the vehicle. Sound waves introduced into the interior of the vehicle via corresponding cast components have a particularly irritating effect on passengers in the vehicle, which means that cast components with planar surfaces have a detrimental effect on the vehicle acoustics.

The object of the invention is to provide a cast component that has a lower weight and can be produced more cost-efficiently compared to conventional cast components, while retaining at least the stiffness and acoustic properties of conventional cast components.

These and other objects are achieved according to the invention by a cast component, in particular for a vehicle, wherein on at least one wall portion of the cast component a surface structuring that forms a surface of the wall portion and stiffens the wall portion is disposed. The surface structuring is formed by a plurality of evenly shaped depressions in the surface of the wall portion, which depressions are mutually spaced apart, leaving interconnected webs, and produce tapered sections on the wall portion.

Because of the stiffening surface structuring, the wall portion of the cast component according to the invention has stiffness properties that correspond at least to the stiffness properties of conventional cast components, despite the tapered sections formed thereby. This is achieved, in particular, by the development of the interconnected webs between depressions disposed adjacently to each other. The stiffening surface structuring effects that forces can be introduced into the wall portion or the cast component without the wall portion or the cast component being deformed by doing so.

The webs developed between the depressions cross the surface of the wall portion so that the wall portion does not have a planar surface. This prevents the wall portion from forming an oscillation membrane, which would lead to the aforementioned disadvantageous acoustic effects. Consequently, the cast component according to the invention has better acoustic properties than conventional cast components with planar surfaces.

Because of the tapered sections produced by the depressions on the wall portion, the cast component according to the invention can be produced using a lesser quantity of material and thus having a lower weight than conventional cast components. However, if the material strength of a conventional cast component were to be uniformly tapered, doing so would result in poorer stiffness properties and a poor acoustic insulation effect of the conventional cast component. The cast component according to the invention is therefore optimized with respect to its weight and, because it is produced with less material, it can be produced more cost-efficiently than conventional cast components.

The cast component can also have two or more wall portions provided with a corresponding stiffening surface structuring. Also, the cast component can be provided completely with a corresponding stiffening surface structuring.

The cast component can be developed as a vehicle component, in particular as a spring support to connect a spring and a bumper to a vehicle body.

According to an advantageous embodiment, the depressions are configured to be polygonal or round in a top view of the surface of the wall portion. This lends the stiffening surface structuring very good stiffness properties. A roundly developed depression can be developed annular, elliptical or oval.

According to a further advantageous embodiment, the depressions are configured hexagonally in a top view of the surface of the wall portion and form a honeycomb structure. It is known that such a honeycomb structure has very good stiffness properties and has a very good ratio between wall material and depression volume, which leads to a maximum weight reduction with respect to the cast component.

Advantageously, the cast component is formed of aluminum. This too can further reduce the weight of the cast component, which is an advantage in particular with respect to a cast component used for the production of a vehicle.

A method according to the invention is provided for the production of a cast component, in particular for a vehicle, using a casting method. On at least one wall portion of the cast component, a surface structuring that forms a surface of the wall portion and stiffens the wall portion is developed, wherein the surface structuring is developed by a plurality of evenly shaped depressions in the surface of the wall portion, which depressions are mutually spaced apart, leaving interconnected webs, and produce tapered sections on the wall portion.

This method appropriately leads to the advantages described earlier with respect to the cast component.

According to an advantageous development, the depressions are configured to be polygonal or round in a top view of the surface of the wall portion. This development appropriately results in the advantages and embodiment forms described earlier with reference to the corresponding development of the cast component.

According to a further advantageous embodiment, the depressions are configured hexagonally in a top view of the surface of the wall portion. This embodiment appropriately results in the advantages described above with respect to the corresponding embodiment of the cast component.

Another advantageous embodiment provides that the casting method is a pressure casting method. This allows a mass production of cast components according to the invention, in particular in the automotive industry.

Advantageously, the pressure casting method is an aluminum pressure casting method. In this way, cast components can be made of aluminum and consequently with a low weight.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
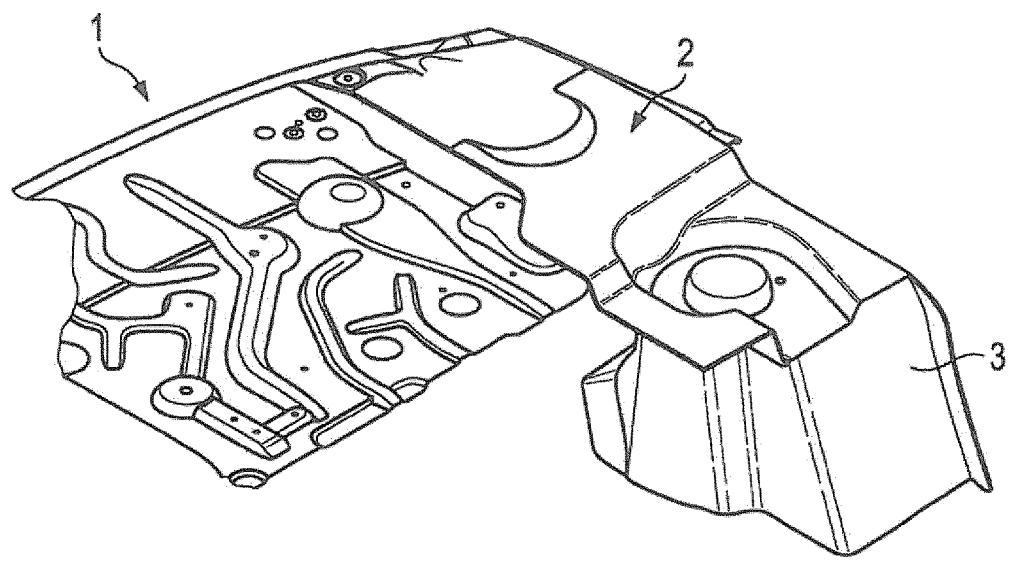
FIG. 1 is a perspective representation of a conventional cast component integrated in a vehicle body.

FIG. 1 shows a perspective representation of a conventional cast component 2 installed in a vehicle body 1. The cast component 2 is developed as a spring support of the vehicle body 1. The cast component 2 has a wall portion 3 with an even wall strength and a planar surface. The planar wall portion 3 forms an oscillation membrane, which leads to the aforementioned acoustic disadvantages.

Figure 2:
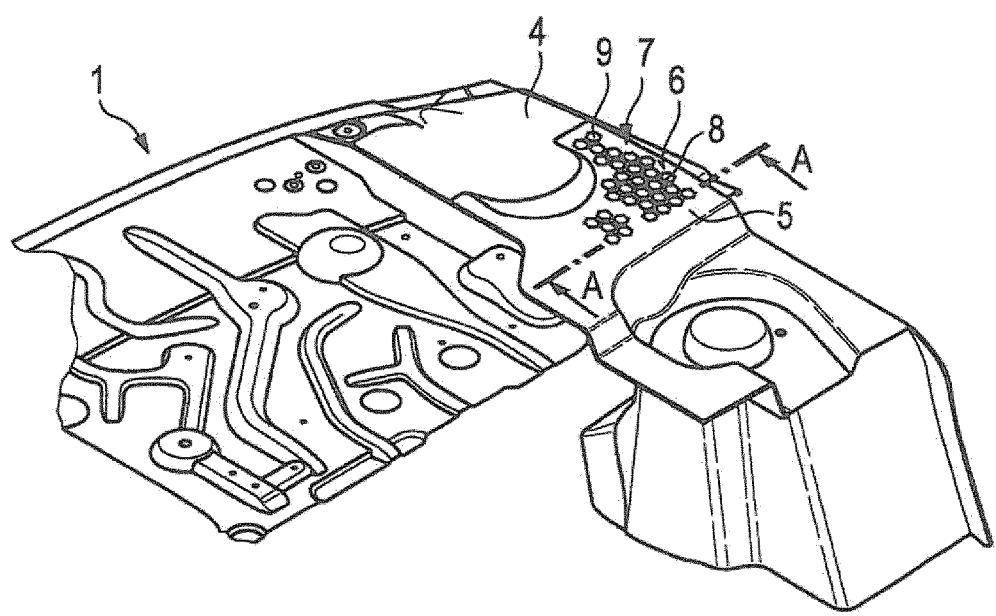
FIG. 2 is a perspective representation of an exemplary embodiment of a cast component according to the invention, integrated in a vehicle body.

FIG. 2 shows a perspective representation of an exemplary embodiment integrated in a vehicle body 1 for a cast component 4 according to the invention, which is developed as an aluminum pressure cast component. On a wall portion 5 of the cast component 4, which is provided with a conventional planar surface, a stiffening surface structuring 7 is provided, which forms the shown surface 6 of the wall portion 5 and stiffens the wall portion 5. The surface structuring 7 is formed in the surface 6 of the wall section 5 by a plurality of evenly shaped depressions 9 in the surface 6 of the wall portion 5, which depressions are mutually spaced apart, leaving interconnected webs 8, and produce tapered sections on the wall portion 5. In a top view of the surface 6 of the wall portion 5, the depressions 9 are developed hexagonally on both sides and form a honeycomb structure.

Figure 3:
FIG. 3 is a sectional representation of the cast component according to the embodiment shown in FIG. 2.

FIG. 3 shows a sectional representation of the cast component 4 according to the embodiment shown in FIG. 2, along the sectional line A-A shown in FIG. 2. In the area of the webs 8, the wall portion 5 has an exemplary wall strength of 3 mm and in the area of the depressions 9 an exemplary material strength of 2 mm. In this way, depending on the number, size and depth of the depressions, the weight savings can be increased.

Figure 4:
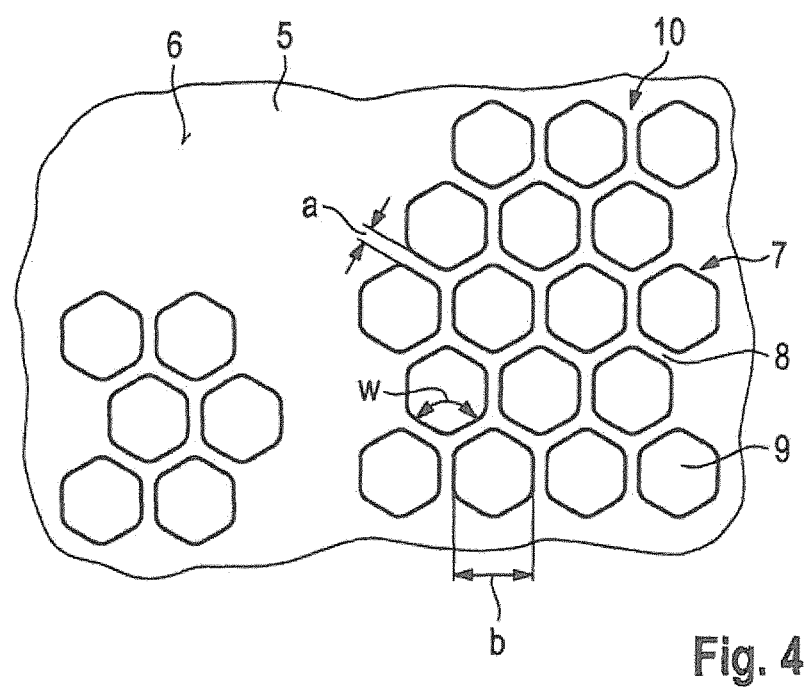
FIG. 4 is a schematic top view of a further exemplary embodiment of a cast component according to the invention.

FIG. 4 shows a schematic top view of a further exemplary embodiment of a cast component 10 according to the invention. In the shown top view of the surface 6 of the wall portion 5 of the cast component 10, the depressions 9 are developed on both sides and hexagonally and form a honeycomb structure. The depression width b is freely scalable and can be 20 mm, for example. The web width a is also freely scalable and can be 3 mm, for example. The angle w is 120° in the exemplary embodiment.

LIST OF REFERENCE SYMBOLS

1 Vehicle body
2 Cast component
3 Wall portion
4 Cast component
5 Wall portion
6 Surface
7 Stiffening surface structuring
8 Web
9 Depression
10 Cast component
a Web width
b Depression width
w Angle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cast component, comprising:
   at least one wall portion of the cast component;
   a stiffening surface structuring configured as a surface of the wall portion, the stiffening surface structuring stiffening the wall portion, wherein
   the stiffening surface structuring comprises a plurality of evenly shaped depressions in the surface of the wall portion,
   the plurality of evenly shaped depressions are mutually spaced apart to leave interconnected webs and produce tapered sections of the wall portion, and occupy less than an entire surface of the wall portion of the cast component, and
   the plurality of depressions, in a top view on the surface of the wall portion, are configured to be hexagonal and form a honeycomb structure.

2. The cast component according to claim 1, wherein the cast component is made of aluminum.

3. The cast component according to claim 1, wherein the cast component is a vehicle cast component.

4. The cast component according to claim 1, wherein the wall portion is configured to form a non-planar surface in a region including at least a portion of the plurality of depressions.

5. The cast component according to claim 4, wherein the wall portion forms a non-oscillation membrane.

* * * * *